United States Patent
Horiuchi

(10) Patent No.: US 12,519,355 B2
(45) Date of Patent: Jan. 6, 2026

(54) ROTOR

(71) Applicant: SANYO DENKI CO., LTD., Tokyo (JP)

(72) Inventor: Manabu Horiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 215 days.

(21) Appl. No.: 18/450,895

(22) Filed: Aug. 16, 2023

(65) Prior Publication Data

US 2024/0063671 A1 Feb. 22, 2024

(30) Foreign Application Priority Data

Aug. 22, 2022 (JP) ................. 2022-132009

(51) Int. Cl.
*H02K 1/27* (2022.01)
*H02K 1/276* (2022.01)
*H02K 29/03* (2006.01)

(52) U.S. Cl.
CPC .............. *H02K 1/276* (2013.01); *H02K 29/03* (2013.01)

(58) Field of Classification Search
CPC .... H02K 1/276; H02K 29/03; H02K 2213/03; H02K 1/28
See application file for complete search history.

(56) References Cited

U.S. PATENT DOCUMENTS

| | | | |
|---|---|---|---|
| 2007/0126304 A1 | 6/2007 | Ito et al. | |
| 2007/0228861 A1 | 10/2007 | Kinoshita | |
| 2012/0112592 A1* | 5/2012 | Yamada | H02K 1/2746 310/156.53 |
| 2015/0372547 A1* | 12/2015 | Kifuji | H02K 1/2766 310/156.01 |
| 2020/0395798 A1 | 12/2020 | Kim et al. | |

FOREIGN PATENT DOCUMENTS

| | | |
|---|---|---|
| EP | 1850456 A2 | 10/2007 |
| EP | 3767792 A1 | 1/2021 |

OTHER PUBLICATIONS

Tuyoshi Nonaka, et al., "Technical Development of Concentrated Flux IPM Motor", Japan Society of Applied Electromagnetics and Mechanics, vol. 24, No. 4, Apr. 2016 and its English partial translation; Cited in Specification.

Extended European Search Report (EESR) dated Jan. 24, 2024 issued in European patent application No. 23185031.4.

* cited by examiner

*Primary Examiner* — Thomas Truong
(74) *Attorney, Agent, or Firm* — RANKIN, HILL & CLARK LLP

(57) ABSTRACT

Provided is a rotor of an interior permanent magnet synchronous motor, including a plurality of poles, in which: each of the plurality of poles includes a main magnet; between the adjacent poles, an auxiliary magnet is provided at an end of the main magnet; and letting a d axis be a center of a rotor magnetic pole formed by the main magnet, and letting a q axis be between magnetic poles of the rotor magnetic poles, an angle formed by a magnetization direction of the auxiliary magnet and the q axis ranges from −45° to +45°.

4 Claims, 9 Drawing Sheets

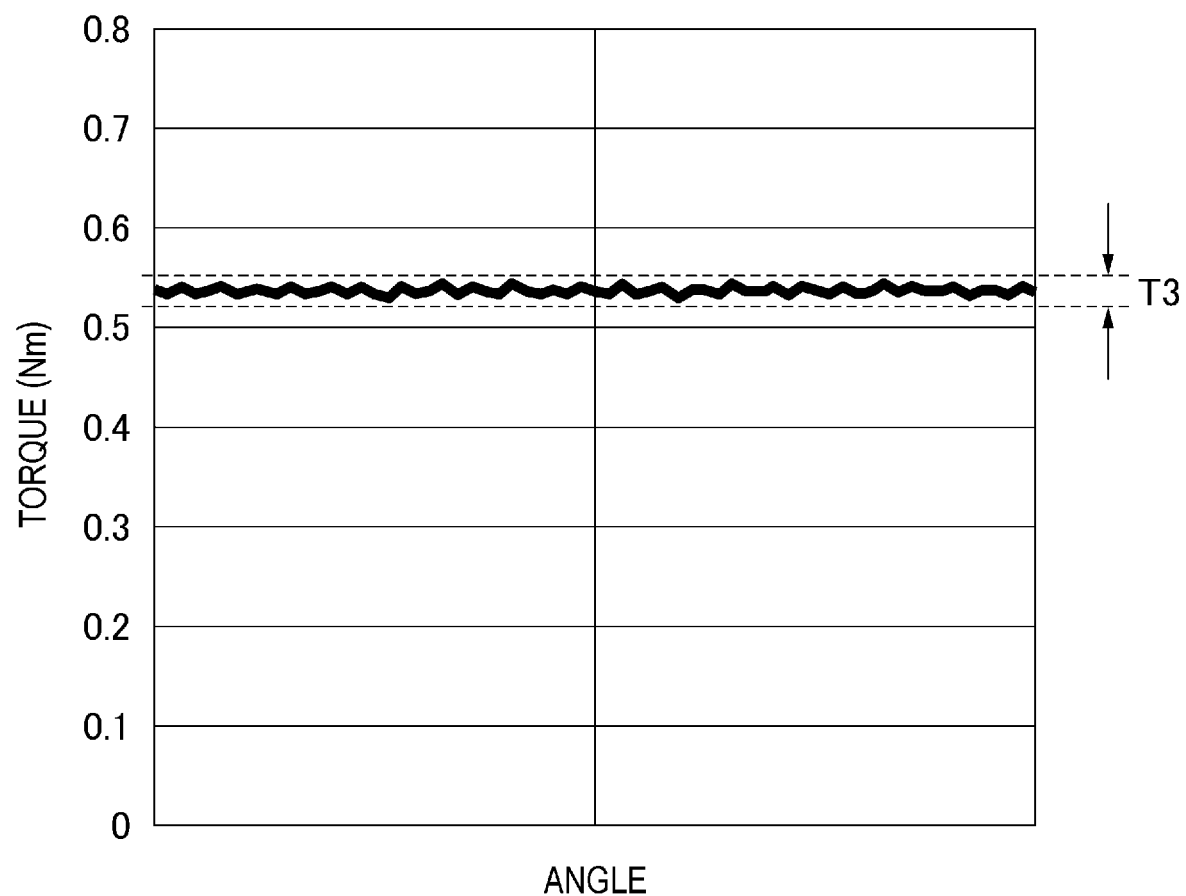

ROTOR

CROSS-REFERENCE TO RELATED APPLICATION

This application is based on Japanese Patent Application No. 2022-132009 filed with the Japan Patent Office on Aug. 22, 2022, the entire content of which is hereby incorporated by reference.

BACKGROUND

1. Technical Field

The present disclosure relates to a rotor of a synchronous motor.

2. Related Art

The torque ripple of a motor causes various problems including the degradation of control performance and an increase in vibration or noise. One of main causes of the ripple is magnetomotive force harmonics of permanent magnets embedded in a rotor. In other words, harmonic components to be produced change, depending on the layout of the magnets. For example, a rotor of a synchronous motor is disclosed in the Japan Society of Applied Electromagnetics and Mechanics, "Technical Development of Concentrated Flux IPM Motor," Vol. 24, No. 4, 2016 (cited reference). In the rotor, permanent magnets are embedded in slit holes each provided on an arc centered around the magnetic pole.

The rotor disclosed in the cited reference has a surface permanent magnet synchronous motor (SPMSM) structure and an interior permanent magnet synchronous motor (IPMSM) structure. The layout of a plurality of permanent magnets can be changed in the rotor having this structure, which changes the magnetomotive force of the rotor. Flux barriers are provided around the permanent magnets. Hence, the layout of the plurality of permanent magnets is restricted. As a result, it may be difficult to reduce the harmonic components of the air-gap flux density.

SUMMARY

A rotor of an interior permanent magnet synchronous motor according to an embodiment of the present disclosure includes a plurality of poles, in which: each of the plurality of poles includes a main magnet; and between the adjacent poles, an auxiliary magnet is provided at an end of the main magnet.

BRIEF DESCRIPTION OF DRAWINGS

FIG. 9 is a diagram illustrating a composite torque waveform in the rotor of the synchronous motor according to the second embodiment.

DETAILED DESCRIPTION

Figure 1:
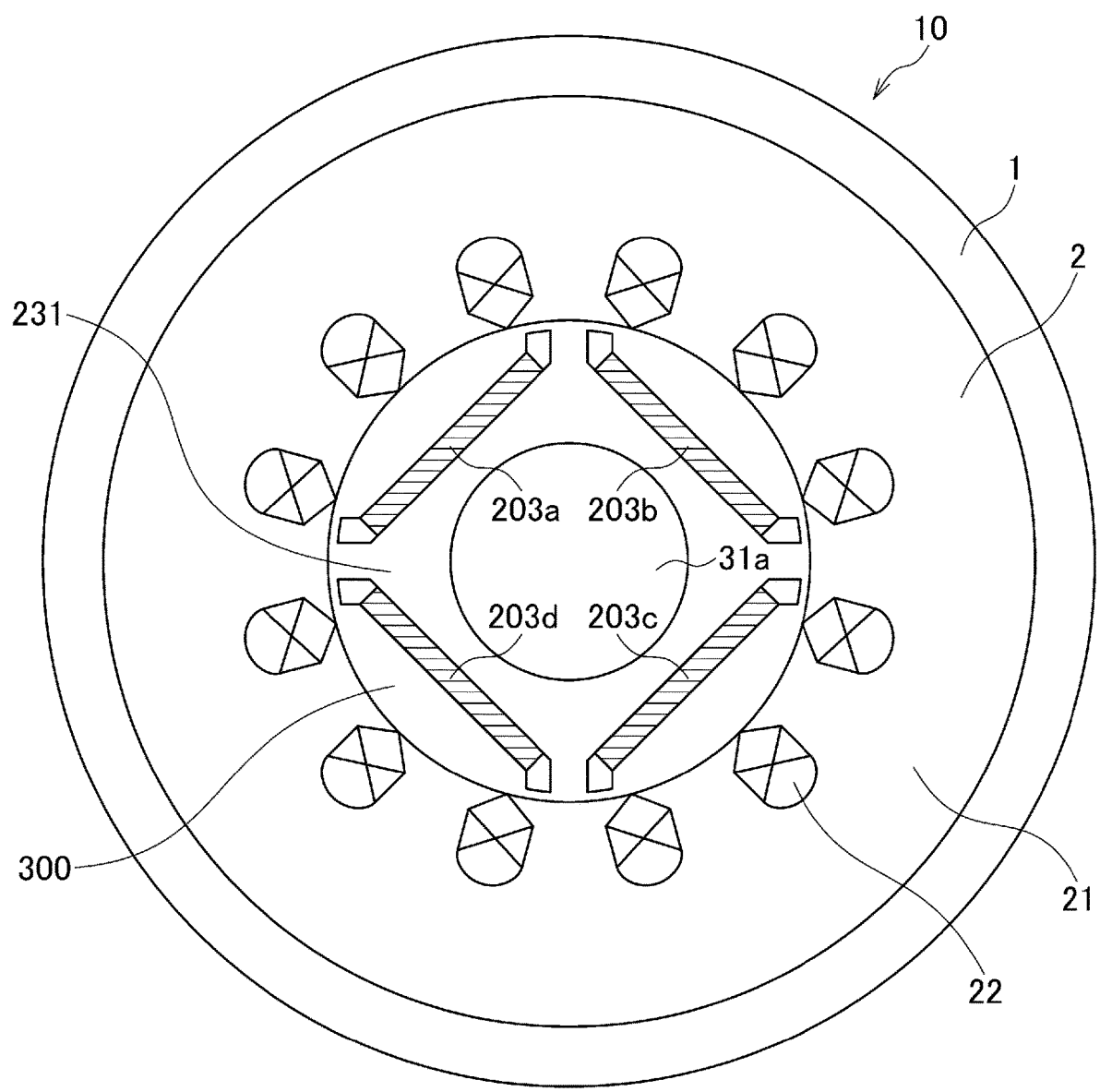
FIG. 1 is a horizontal cross-sectional view of a synchronous motor used in a reference example.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a rotor of a synchronous motor, which can decrease torque ripple.

A rotor of an interior permanent magnet synchronous motor according to one aspect of the present disclosure includes a plurality of poles, in which: each of the plurality of poles includes a main magnet; and between the adjacent poles, an auxiliary magnet is provided at an end of the main magnet.

In the rotor according to the embodiment, permanent magnets of the rotor in the interior permanent magnet synchronous motor are placed in such a manner as to produce magnetomotive force not only at the centers of magnetic poles but also between the poles. Accordingly, a harmonic ripple component can be decreased.

Embodiments of the present disclosure are described hereinafter with reference to the drawings. Note that descriptions of members having the same reference numerals as members that have already been described are omitted in the detailed description for convenience's sake. Moreover, the dimensions of each member illustrated in the drawings may be different from actual dimensions thereof for the convenience of description.

FIG. 1 is a horizontal cross-sectional view of a synchronous motor 10 according to a reference example.

As illustrated in FIG. 1, the synchronous motor 10 includes a stator 2 fixed to a cylindrical housing 1, and a rotor 300 that can rotate relative to the stator 2.

The stator 2 includes a ring-shaped stator core 21 formed of a plurality of electromagnetic steel plates (second core sheets) laminated in a rotation axis direction. The stator core 21 includes a plurality of stator coils 22 on an inner peripheral surface side thereof. The plurality of stator coils 22 is placed in a circular fashion. In such a configuration, alternating current is applied to the plurality of stator coils 22 from the outside.

The rotor 300 includes a rotor core 231 formed of a plurality of electromagnetic steel plates (first core sheets) laminated in the rotation axis direction. The rotor core 231 is formed a cylinder form. A shaft mounting hole 31a is formed in a radially central part of the rotor core 231. An unillustrated drive shaft is fixed in the shaft mounting hole 31a. The drive shaft is rotatably supported by a housing 1.

The rotor 300 includes four rotor magnets 203a to 203d in the rotor core 231. The rotor magnets 203a to 203d are made of a permanent magnet. The rotor magnets 203a to 203d are embedded in a slot, which enables the rotor magnets 203a to 203d to be firmly fixed therein. The each of the rotor magnets 203a to 203d forms one pole having a different polarity.

Figure 2:
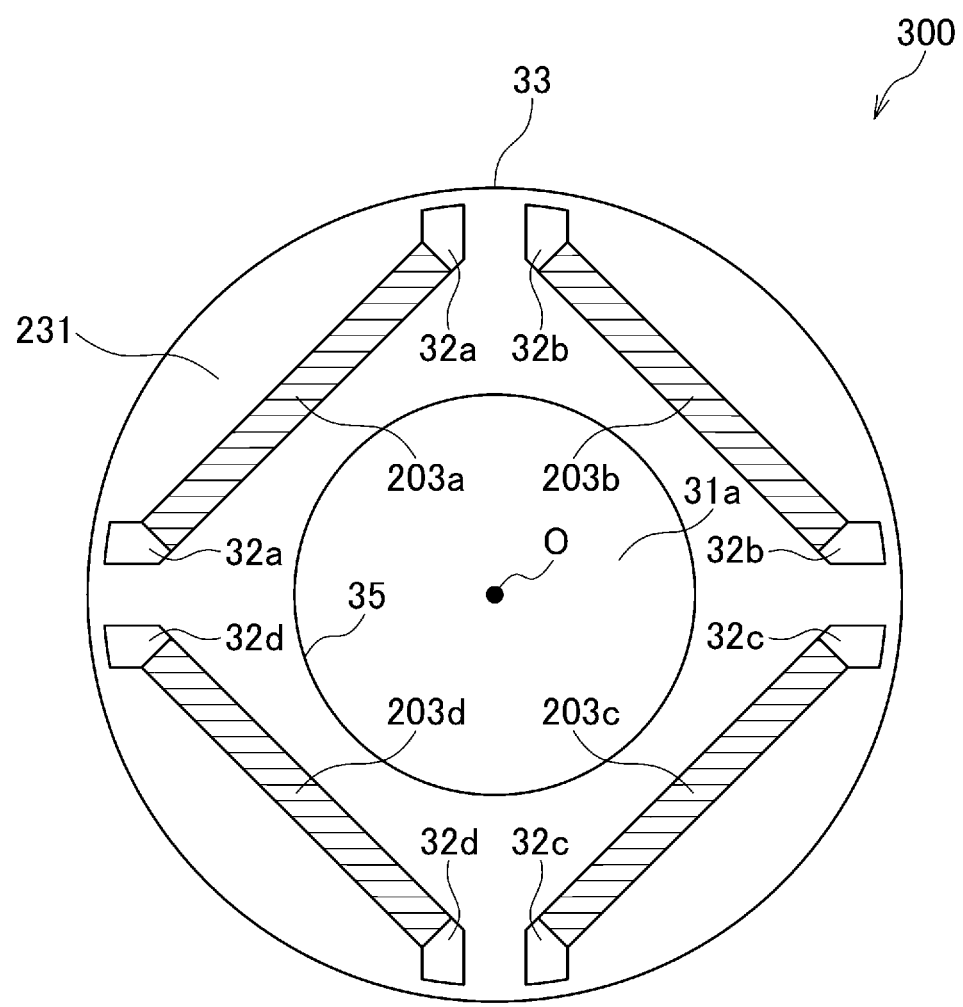
FIG. 2 is a horizontal cross-sectional view of a rotor of the synchronous motor used in the reference example.
Figure 3:
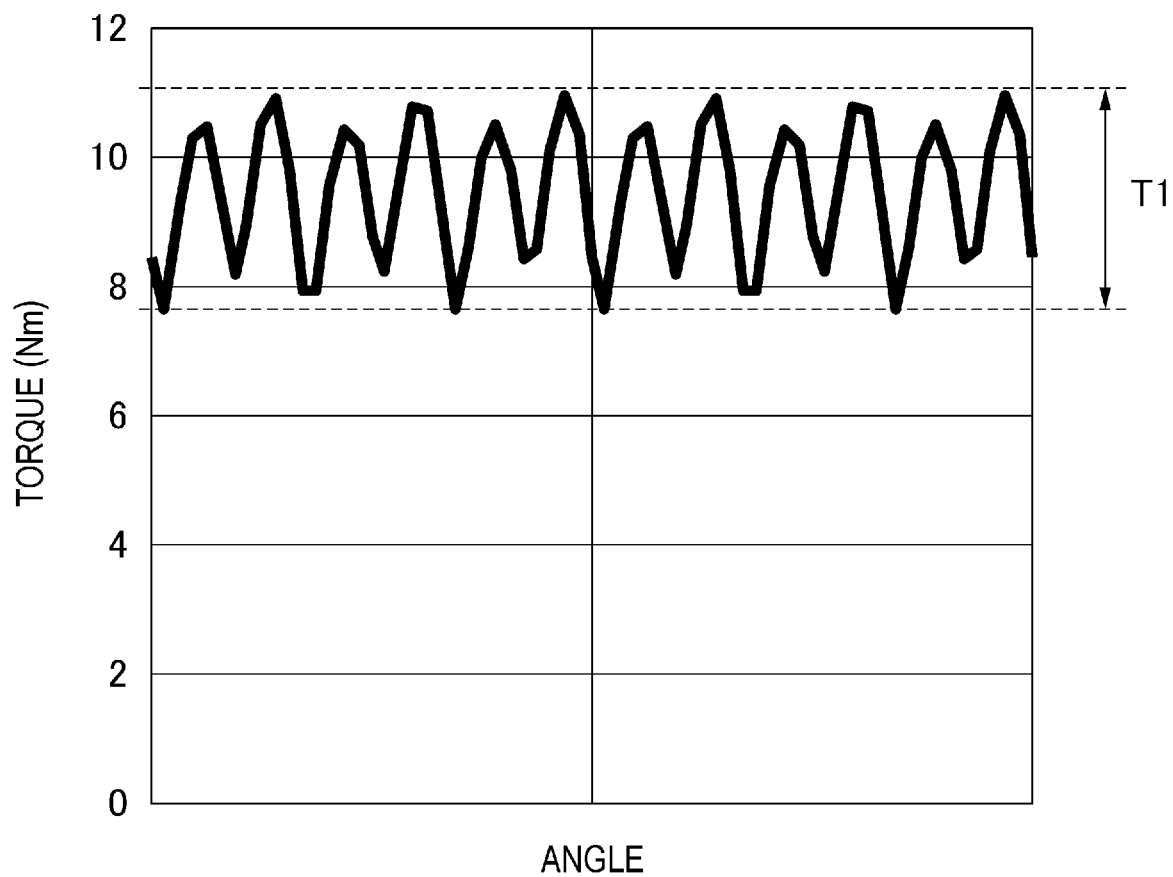
FIG. 3 is a diagram illustrating a torque waveform in the rotor of the synchronous motor used in the reference example.

In order to describe the details of a rotor 3 of a synchronous motor 100 according to the embodiment, the rotor 300 of the synchronous motor 10 used in the reference example is described as a comparison target with reference to FIGS. 2 and 3.

FIG. 2 is a horizontal cross-sectional view of the rotor 300 of the synchronous motor 10 used in the reference example. As illustrated in FIG. 2, the rotor 300 includes the rotor core 231 formed of the plurality of electromagnetic steel plates laminated in the rotation axis direction. The rotor core 231 includes the four rotor magnets 203a to 203d. An outer peripheral portion 33 and an inner peripheral portion 35 of the rotor core 231 has a circular shape centered around a rotation center O. The rotor magnets 203a to 203d are made of a permanent magnet. The permanent magnets are embedded in slits of the rotor core 231.

The each of the rotor magnets 203a to 203d is formed in a cylindrical column form. The rotor magnets 203a to 203d have substantially the same size, material, or composition. Moreover, the rotor magnets 203a to 203d are placed at regular intervals on a circumference centered around the rotation center O and along tangent lines of the circumference. Therefore, the magnetomotive forces for the stator coils resulting from the rotor magnets 203a to 203d are substantially equal. Moreover, cavity portions 32a to 32d extending outward in a direction of the radius of the rotor core 231 in cross section are provided at respective two ends of the rotor magnets 203a to 203d.

FIG. 3 a diagram illustrating a torque waveform in the rotor 300 of the synchronous motor 10 used in the reference example. The horizontal axis represents angle. The vertical axis represents torque. A reference numeral T1 illustrated in FIG. 3 represents the value of torque ripple of the torque waveform. Note that the synchronous motor 10 including the rotor 300 used to measure the torque waveform of FIG. 3 has a structure of a 10-pole 12-slot interior permanent magnet synchronous motor (IPMSM) with concentrated winding.

Generally, it is known that the sixth harmonic torque ripple component is generated in a motor. The sixth harmonic ripple component can become a cause of the deterioration of motor controllability, vibration, or noise.

Main causes of the generation of torque ripple are the following flux density harmonic components (1) to (4):

(1) Rotating magnetic field harmonics that are harmonics superimposed on the rotating magnetic field of an armature;
(2) Field magnetomotive force harmonics that are magnetomotive force harmonics generated by, for example, magnetomotive force (shape or layout) of the rotor magnets;
(3) Phase belt harmonics that are harmonics resulting from the layout of armature winding; and
(4) Slot harmonics that are harmonics due to air-gap permeance variations resulting from armature winding slots.

Of them, (1) to (3) are known to appear mainly as the fifth or seventh harmonic component of the air-gap flux density. Moreover, the sixth harmonic torque ripple component is known to result from the fifth or seventh harmonic component of the air-gap flux density.

Attention was given to a reduction in the sixth harmonic ripple component being a main component of torque ripple by placing the permanent magnets of the rotor of the interior permanent magnet synchronous motor in such a manner as to produce magnetomotive force not only at the centers of the magnetic poles but also between the poles. The magnetomotive force is produced also between the poles to change the amplitudes and phases of the fifth or seventh harmonic of and a harmonic of a multiple of order 5 or 7 of the air-gap flux density, which are causes of the sixth harmonic torque ripple component. The amplitudes of these harmonic components are reduced to enable a reduction in torque ripple pulsation. Moreover, the phases of these harmonic components are made opposite so that it is possible to change the phase of the torque ripple.

First Embodiment

The rotor 3 of the synchronous motor 100 according to a first embodiment is described in detail below with reference to FIGS. 4 and 5.

Figure 4:
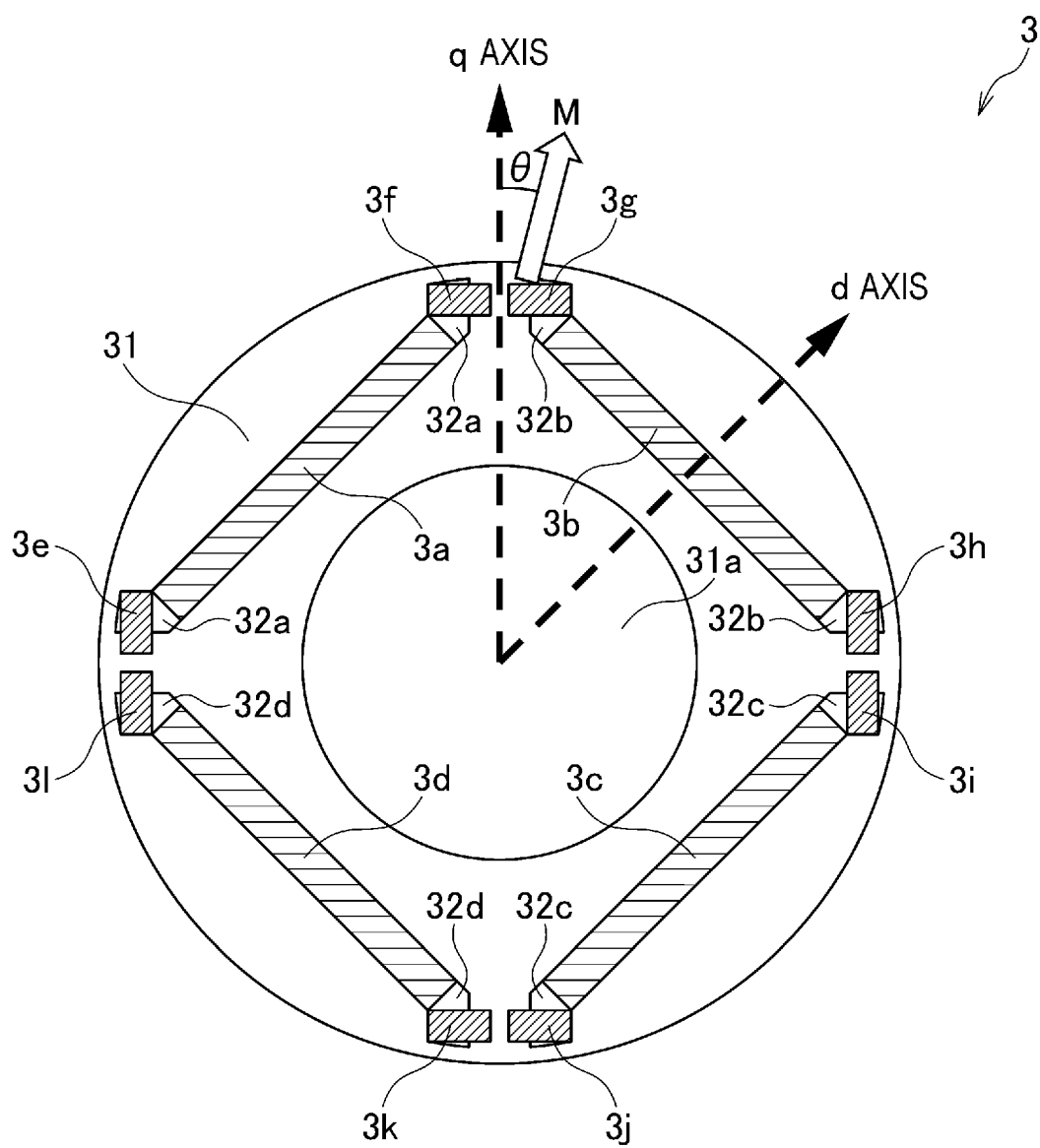
FIG. 4 is a horizontal cross-sectional view of a rotor of a synchronous motor according to a first embodiment.

FIG. 4 is a horizontal cross-sectional view of the rotor 3 of the synchronous motor 100 according to the first embodiment.

As illustrated in FIG. 4, rotor magnets 3a to 3d are provided at their respective two ends with rotor magnets 3e to 3l as auxiliary magnets in the rotor 3 in contrast to the rotor 300 of the synchronous motor 10 used in the reference example illustrated in FIG. 2. The rotor magnets 3e to 3l are embedded in cavity portions 32a to 32d, respectively. Consequently, the rotor magnets 3e to 3l are firmly fixed therein.

Note that each of the rotor magnets 3e to 3l is simply required to be provided between the poles. In the exemplification of FIG. 4, the rotor magnets 3e to 3l are each provided at positions extended in longitudinal directions from ends of the rotor magnets 3a to 3d. However, the positions of the rotor magnets 3e to 3l are not limited to this example. Moreover, in the exemplification of FIG. 4, the rotor magnets 3e to 3l are formed in a cylinder form. However, the shape of the rotor magnets 3e to 3l is not limited to this example.

In the exemplification of FIG. 4, a d axis represents the center of a rotor magnetic pole formed by the rotor magnets 3a to 3d being main magnets. Moreover, a q axis represents between the magnetic poles of adjacent rotor magnetic poles. An angle θ formed by a magnetization direction M of the each of the rotor magnets 3e to 3l being the auxiliary magnets and the q axis desirably ranges from −45° to +45°. Note that in FIG. 4, the d axis, the q axis, and the angle θ formed by the magnetization direction M of the rotor magnet 3g being the auxiliary magnet and the q axis at the rotor magnetic poles are explicitly illustrated for the rotor magnets 3a and 3b of a plurality of the rotor magnets 3a to 3d being the main magnets.

Figure 5:
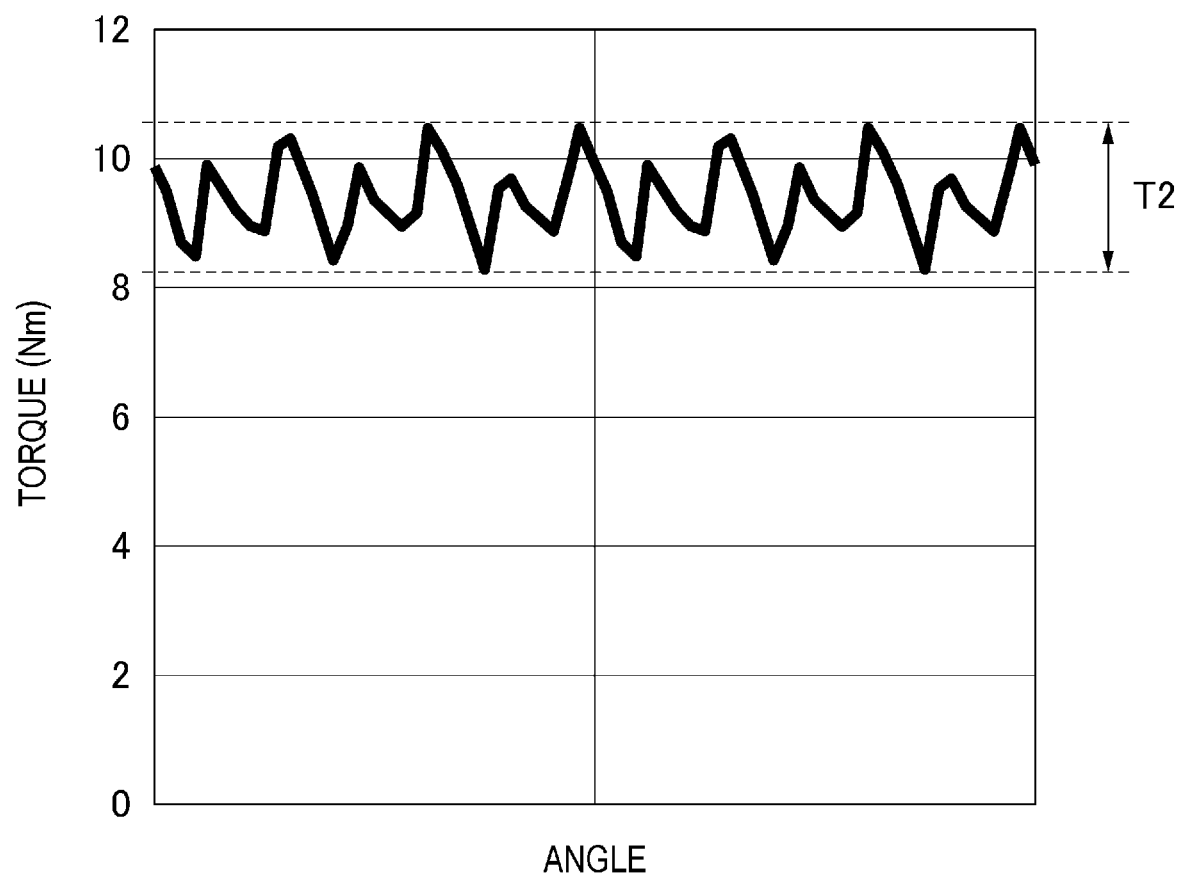
FIG. 5 is a diagram illustrating a torque waveform in the rotor of the synchronous motor according to the first embodiment.

FIG. 5 is a diagram illustrating a torque waveform in the rotor 3 of the synchronous motor 100 according to the first embodiment. The horizontal axis represents angle. The vertical axis represents torque. Note that the synchronous motor 100 including the rotor 3 used to measure the torque waveform of FIG. 5 has a structure of a 4-pole 24-slot interior permanent magnet synchronous motor (IPMSM) with distributed winding.

As illustrated in FIG. 5, torque ripple T2 in the rotor 3 of the synchronous motor 100 according to the first embodiment is reduced as compared to torque ripple T1 of the rotor 300 of the synchronous motor 10 used in the reference example illustrated in FIG. 3. In other words, the rotor magnets 3e to 3l as the auxiliary magnets that are provided at the two ends of the rotor magnets 3a to 3d produce magnetomotive force not only at the magnetic pole centers but also between the poles. Consequently, the torque ripple is reduced. Therefore, for example, vibration or noise is reduced. Accordingly, the performance of the motor can be improved.

Second Embodiment

A rotor 3' of a synchronous motor 100 according to a second embodiment is described in detail below with reference to FIGS. 6 to 9.

Figure 6:
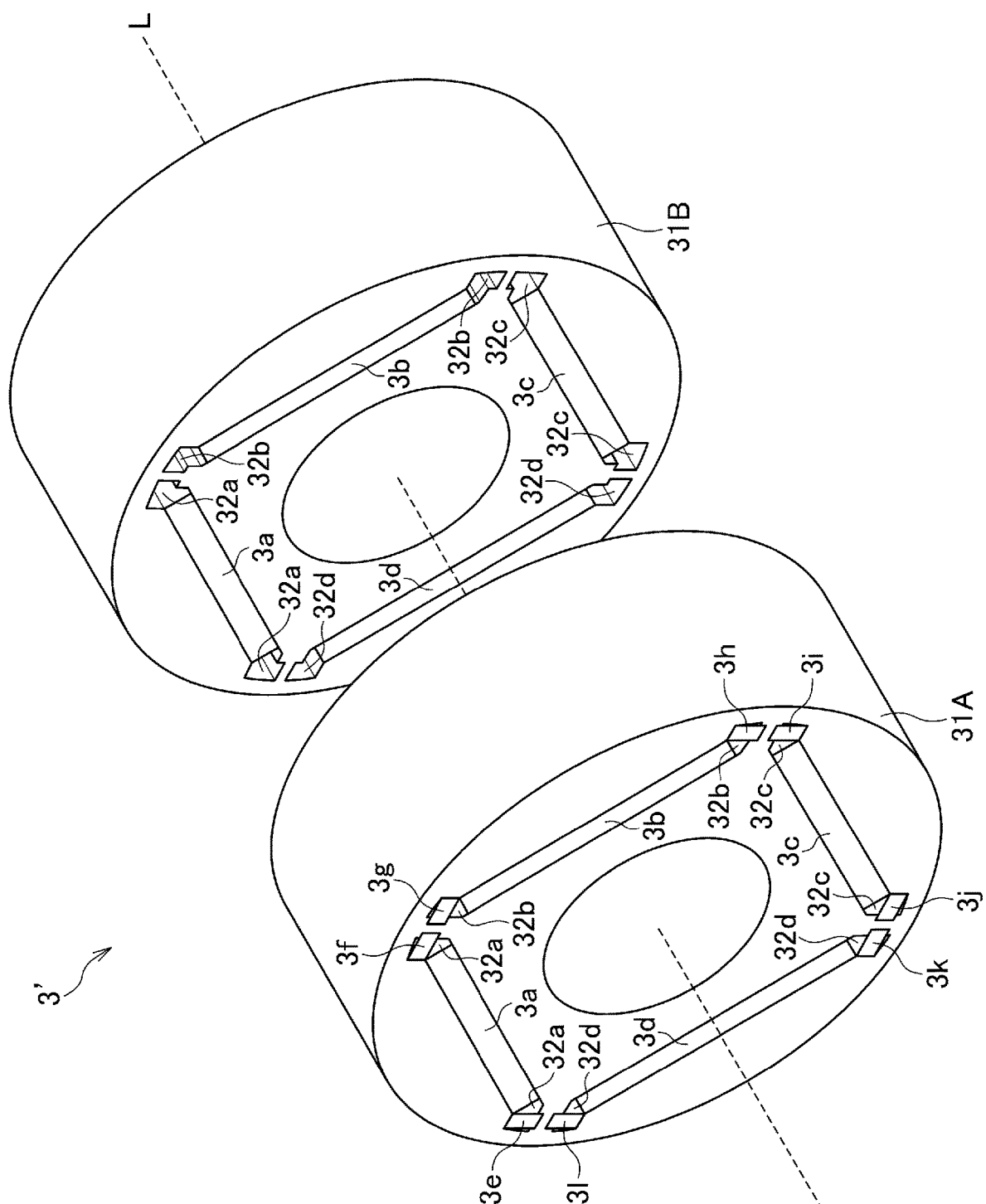
FIG. 6 is a schematic diagram of a rotor of a synchronous motor according to a second embodiment.

FIG. 6 is a schematic diagram of the rotor 3' of the synchronous motor 100 according to the second embodiment. The configuration of the rotor 3' is a combination of the configuration of the rotor 300 of the synchronous motor 10 used in the reference example and the configuration of the rotor 3 of the synchronous motor 100 according to the first embodiment.

A rotor core of the rotor 3' has a configuration including a plurality of first core sheets 31A and 31B laminated in a rotation axis direction L. As the first core sheets 31A and 31B adjacent in the axial direction are perspectively viewed in the axial direction, at least one of the first core sheets (the first core sheet 31A in the exemplification of FIG. 6) is provided with the rotor magnets 3e to 3l as auxiliary magnets.

Figure 7:
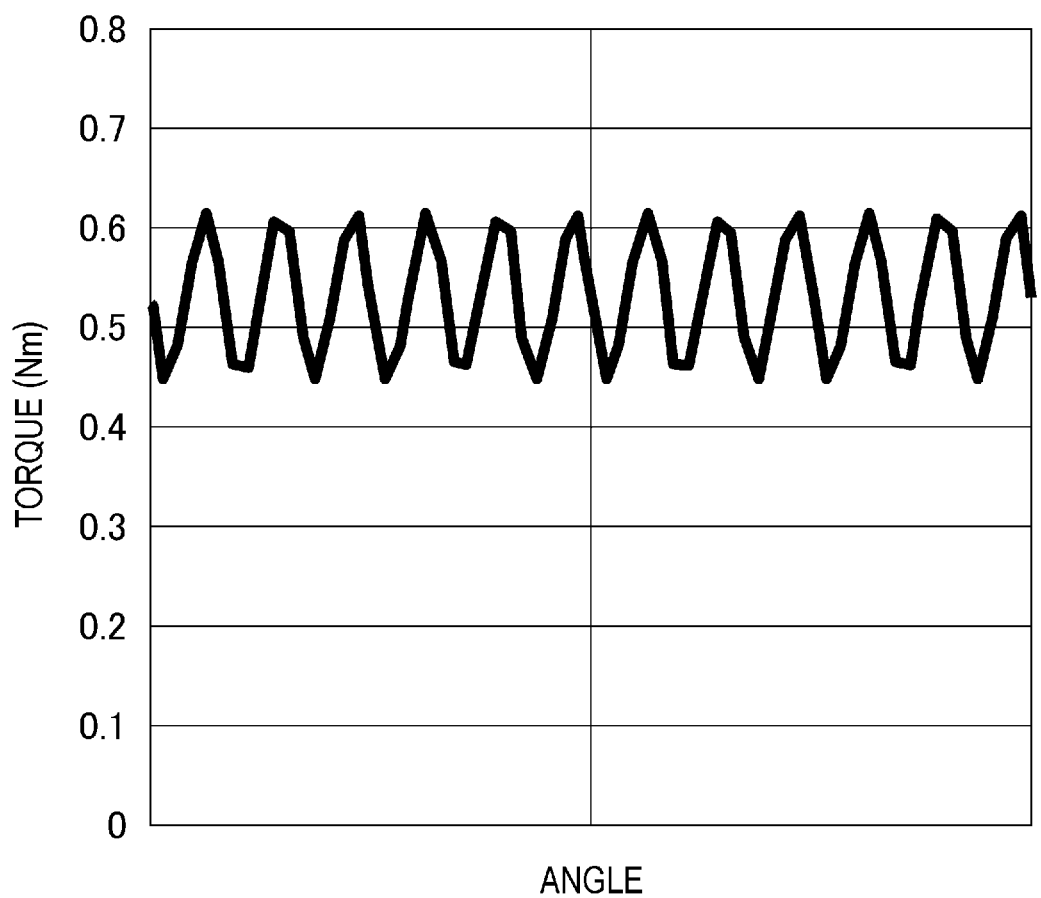
FIG. 7 is a diagram illustrating a torque waveform in an area including a first core sheet 31A of the rotor 3' illustrated in FIG. 6.
Figure 8:
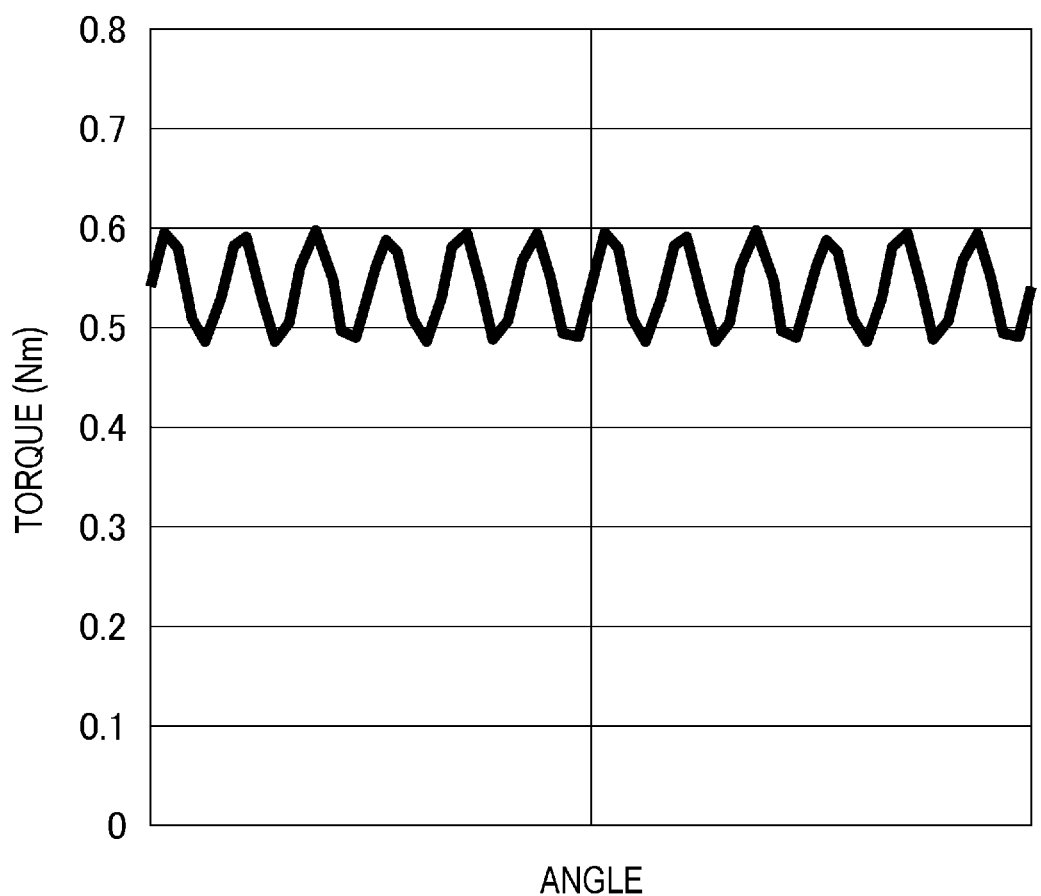
FIG. 8 is a diagram illustrating a torque waveform in an area including a first core sheet 31B of the rotor 3' illustrated in FIG. 6.

FIG. 7 is a diagram illustrating a torque waveform in an area including the first core sheet 31A of the rotor 3' illustrated in FIG. 6. FIG. 8 is a diagram illustrating a torque waveform in an area including the first core sheet 31B of the rotor 3' illustrated in FIG. 6. In FIGS. 7 and 8, the horizontal axis represents angle. The vertical axis represents torque.

When FIGS. 7 and 8 are compared, the phase of the torque waveform in the area including the first core sheet 31A and the phase of the torque waveform in the area including the first core sheet 31B are opposite to each other.

FIG. 9 is a diagram illustrating a torque waveform in the entire synchronous motor including the rotor 3' according to the second embodiment illustrated in FIG. 6. The horizontal axis represents angle. The vertical axis represents torque. The torque waveform illustrated in FIG. 9 is a composite waveform of the torque waveform illustrated in FIG. 7 and the torque waveform illustrated in FIG. 8. Note that the synchronous motor 100 including the rotor 3' used to measure the torque waveform of FIG. 9 has a structure of a 10-pole 12-slot IPMSM with concentrated winding.

The phase of the torque waveform illustrated in FIG. 7 and the phase of the torque waveform illustrated in FIG. 8 are opposite to each other. Hence, the two torques are combined as the torque of the entire synchronous motor. Consequently, the ripple is cancelled out. As a result, the harmonic components of torque ripple T3 are reduced. Therefore, for example, vibration or noise is reduced. Accordingly, the performance of the motor can be improved.

Up to this point the embodiments of the present disclosure have been described. However, it needless to say that the technical scope of the embodiments should not be construed in a limited manner by the above-mentioned detailed description. The above-mentioned embodiments are mere examples. Those skilled in the art understand that the embodiments can be modified in various manners within the scope of the disclosure described in the claims. The technical scope of the embodiments should be determined on the basis of the scope of the disclosure described in the claims and the scope of equivalents thereof.

In the above-mentioned embodiments, the rotor used in the synchronous motor is described. However, the rotor according to the embodiments can also be applied to a synchronous generator.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A rotor of an interior permanent magnet synchronous motor, comprising a plurality of poles, wherein
    each of the plurality of poles includes a main magnet,
    between the adjacent poles, an auxiliary magnet is provided at an end of the main magnet, and
    letting a d axis be a center of a rotor magnetic pole formed by the main magnet, and letting a q axis be an axis extending in a radial direction and positioned in a center between adjacent rotor magnetic poles, an angle formed by a magnetization direction of the auxiliary magnet and the q axis ranges from −45° to +45°.

2. The rotor according to claim 1, wherein
    the rotor includes a plurality of core sheets laminated in a rotation axis direction, and
    as the core sheets adjacent in a rotation axis direction are perspectively viewed in the rotation axis direction, at least one of the core sheets is provided with the auxiliary magnets.

3. A motor or generator comprising:
    the rotor according to claim 1; and
    a stator.

4. The rotor according to claim 1, wherein
    the rotor includes
        a first core sheet, and
        a second core sheet adjacent to the first core sheet in a rotation axis direction, wherein
    the main magnet extends in the rotation axis, and is provided in the first core sheet and the second core sheet, and
    the auxiliary magnet extends in the rotation axis, and is provided in the first core sheet and is not provided in the second core sheet.

* * * * *